(12) United States Patent
Janicek

(10) Patent No.: US 8,228,626 B2
(45) Date of Patent: Jul. 24, 2012

(54) COLOR WHEEL WITH INDIVIDUAL BALANCING MASSES ALONG A GUIDE

(75) Inventor: Emil Janicek, Westminster, CO (US)

(73) Assignee: Oerlikon Trading AG, Trubbach, Trubbach (CH)

( * ) Notice: Subject to any disclaimer, the term of this patent is extended or adjusted under 35 U.S.C. 154(b) by 204 days.

(21) Appl. No.: 12/043,353

(22) Filed: Mar. 6, 2008

(65) Prior Publication Data

US 2009/0021851 A1  Jan. 22, 2009

Related U.S. Application Data

(60) Provisional application No. 60/895,757, filed on Mar. 20, 2007.

(51) Int. Cl.
  G02B 5/22 (2006.01)
  G02B 7/00 (2006.01)
  G03B 21/14 (2006.01)
(52) U.S. Cl. ............................ 359/892; 359/889; 353/84
(58) Field of Classification Search .................. 359/889, 359/892; 353/84
  See application file for complete search history.

(56) References Cited

U.S. PATENT DOCUMENTS

| 3,017,224 A | 1/1962 | Palmer |
| 4,003,265 A | 1/1977 | Craig et al. |
| 5,074,723 A | 12/1991 | Massa et al. |
| 6,705,733 B1 | 3/2004 | Yu et al. |
| 2003/0035218 A1 | 2/2003 | Hung |
| 2004/0045397 A1 | 3/2004 | Chang |
| 2005/0099712 A1* | 5/2005 | Kao et al. ................ 359/892 |
| 2005/0109154 A1* | 5/2005 | Chang ........................ 74/573 R |
| 2005/0275961 A1 | 12/2005 | Chung et al. |
| 2006/0227442 A1 | 10/2006 | Hsu et al. |

FOREIGN PATENT DOCUMENTS

| DE | 1074442 A | 5/1958 |
| DE | 3505014 A1 | 8/1985 |
| DE | 8708770 U1 | 8/1987 |
| DE | 102006020648 A1 | 11/2007 |

OTHER PUBLICATIONS

Article, "Balancing Primer," by Mechanical Power Transmission Association.

* cited by examiner

*Primary Examiner* — Jade R Chwasz
(74) *Attorney, Agent, or Firm* — Pearne & Gordon LLP

(57) ABSTRACT

A color wheel is provided with a balancing device. The balancing device encompasses an essentially circular track whose center point coincides with the axial center of rotation of the color wheel. The track is provided with at least two mutually independent, movable balancing weights. Moving the balancing weights along the track requires a force greater than the gravitational force of the balancing weight. To balance a color wheel, a determination is made of a position in which a balancing weight corresponding to the total weight of the balancing weight system would have to be placed in order to balance the color wheel. At least one of the balancing weights is then moved to the position, according to the determination, where one of the balancing weights corresponding to the total weight of the balancing weight system would have to be placed.

2 Claims, 1 Drawing Sheet

COLOR WHEEL WITH INDIVIDUAL BALANCING MASSES ALONG A GUIDE

FIELD OF THE INVENTION

The present invention relates to color wheels used for projectors to generate color sequential illumination. The present invention relates as well to projectors using such color wheels.

DESCRIPTION OF RELATED ART

Devices of the aforementioned type are used in applications where periodic color changes need to be produced in rapid sequence. Examples of optical systems using such devices are picture generation devices or display arrangements. Rear or front projection systems for television systems are typical applications.

In order to produce the required rapid color changes, color filters are inserted into the optical light path of a light beam in rapid sequence. For this purpose a carrier is used that is equipped with circularly arranged filter segments on the periphery. This arrangement forms a color rotor with parts of the segments radially extending over the carrier and thereby forming a color ring to be inserted into the optical path. This color rotor is rotated around its central axis. Through the rotation of the color rotor the filter segments are alternatingly inserted into the optical path and removed from it. Thereby the desired rapid color change is produced. In order to realize this rotation the color rotor is fixed to a motor. Color rotor and motor form a color wheel.

Since the picture generation device must be able to produce a high picture quality, the color changes must be executed very rapidly. This means that the filter segments must be moved through the optical path of the light beam at very high speed. Fast rotation of the color rotor is therefore mandatory. As a result large forces due to accelerations which are several hundred times larger than the acceleration g due to gravity act on the color rotor and particularly on the sensitive filter segments; for particularly high picture qualities the accelerations can exceed 1000 g. Such picture generation devices must also satisfy very high brightness requirements which can only be achieved with powerful light sources. Through these powerful light sources the device is subjected to correspondingly high temperatures of up to 100° C.

In addition the radial concentricity of the device must be highly accurate in order to achieve a long operational life of the device. Therefore special care must be taken in balancing such color wheels.

However broad-scale utilization in so-called low-cost display applications is only feasible if it becomes possible to produce the color wheel at very low costs despite the high quality requirements. Therefore no complicated and expensive balancing methods may be applied.

There are different schemes of balancing methods known in the art: Static as well as dynamical balancing; single and dual plane balancing.

In a classical static approach the rotor of the color wheel is rotated and the unbalance is measured. Unbalance is always present if the center of mass of the rotor does not coincide with the rotational axis. This can be corrected by either removing mass from the rotor at some point distant to the rotational axis (negative balancing) or by adding mass to the rotor at some point (positive balancing).

In order to perform negative balancing, typically holes are drilled into the carrier. If this is done while the color rotor remains connected to the motor there is a good chance that the bearings suffer from the forces they experience during the removal of the mass. One could as well think about removing the rotor form the motor before drilling the holes. Unfortunately this is quite time consuming and therefore renders the balancing method expensive. This is especially true if balancing needs to be performed in an iterative way (rotation—first correction—rotation—second correction . . . ).

In order to perform positive balancing additional balancing weight is attached to the rotor. For color wheels this is typically done by attaching a lump of adhesive to the carrier. If the weight of the adhesive is not enough, the adhesive is used to glue other material with a higher density, such as a piece of steel to the carrier. Performing the balancing procedure by such a step requires a high degree of accuracy and experience, since the adhesive tends to smear out, flowing to parts of the rotor where it should not go to. Therefore the carrier sometimes comprises a circular groove in order to receive the adhesive. This however limits the degree of freedom for positioning the balancing mass. In addition hardening of the adhesive takes in time before the rotor may be brought to rotation again. This makes the method quite expensive for example if balancing needs to be performed in an iterative way as described for the negative balancing.

According to a dynamical balancing method known in the art the carrier or another part of the rotor comprises a container with a ring shaped volume ready for receiving the balancing mass. Before rotating the rotor the adhesive and if necessary for example some metal beads are inserted into the container. The amount of adhesive is kept small enough in order not to fill completely the container. If such an assembly is rotated, the adhesive, together with the beads if present, will automatically flow to the correct axial position in order to minimize the unbalance. The adhesive needs then to be hardened. Care has to be taken, that the adhesive remains at the same position after rotating and before and/or during hardening the adhesive. Here as well this is one degree of freedom less for the position of the balancing mass since the radial position is predetermined by the container.

The balancing methods described until now exclusively refer to single plane balancing. This is often sufficient; especially if the rotor may be well approximated by a thin plate and if rotational speed is moderate. However for color rotors comprised in color wheels the rotational speed is often in the range of 7000 rpm to up to 15000 rpm. In this cases single plane balancing is sometimes no more sufficient and balancing has to be performed for at least two well separated planes perpendicular to the rotational axis.

Here as well the different schemes such as negative balancing, positive balancing or dynamical balancing may be applied, with all the advantages as well as disadvantages of the respective methods.

It is the objective of the present invention to provide for a color wheel which allows for a simplified balancing procedure. This method should at least partially overcome the disadvantages of the methods already known in the art.

SUMMARY OF THE INVENTION

The objective can be met by providing a color wheel comprising two or more solid balancing masses attached to a ring shaped guide. The guide is at least essentially coaxially aligned to the rotational axis of the color wheel. The balancing masses are along the guide movably attached to the guide before and during the balancing procedure. The degree of movability is chosen in such a manner, that the masses do not move due to their own weight, however may be manually moved along the guide by applying forces. The total balancing mass is defined as sum of all individual balancing masses together. This total balancing mass is chosen so high, that it is sufficient to balance the maximal unbalance which reasonably may be expected. For todays color wheel this is up to 60 mg.

In the balancing method according to the present invention the balancing masses are at the beginning arranged in such a way that the center of mass of the balancing mass system is located on the rotational axis of the color wheel. Then the color ring is rotated with the motor and the unbalance of the color wheel is measured. Based on the measurement it can be calculated where the center of mass of the balancing system has to be moved to in order to balance the color wheel.

One or more balancing masses are then moved along the guide in order to move the center of mass of the balancing mass system to the desired position. It is possible to apply a number of iteration loops of measuring the remaining unbalance and moving balancing masses of the balancing mass system to minimize the unbalance.

DETAILED DESCRIPTION OF THE INVENTION

In the following the invention is explained in more detail with the help of the figures and the corresponding embodiments as examples.

Figure 1:
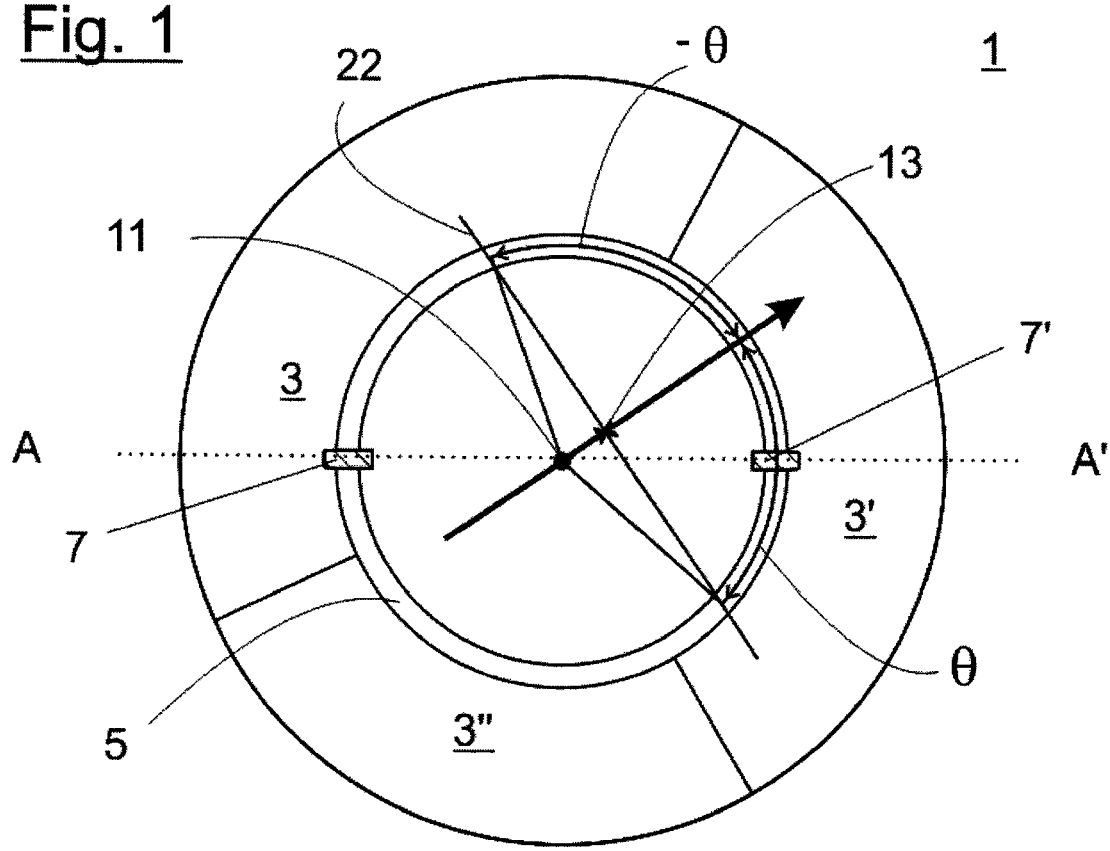
FIG. 1 shows the top view of the color wheel according to one embodiment of the present invention

FIG. 1 shows the top view of a color wheel 1 according to the present invention with filter segments 3, 3' and 3" and a cover with a rim 5 which forms the guide. The cover is fixed to the segments 3, 3', 3" in such a way that the rim 5 at least essentially lies on the rotational axis of the color wheel. On this rim 5 provided are two movably attached clips 7, 7' of equal mass forming a balancing mass system. In the example the clips have a mass of 20 mg and consist of sheet metal. Other materials are possible as well, such as plastic or spring steel. The balancing mass system has a total mass of 40 mg. The arms of the clips 7,7' press against the side walls of the rim 5. In order to shift the clips friction force, larger than the weight of the clips has to be overcome. By this it is guaranteed that the clips do not move due to handling of the color wheels while and after performing the balancing. The clips may comprise means for temporarily forcing apart the arms of the clips in order to decrease the friction force and to allow for shifting them.

Figure 2:
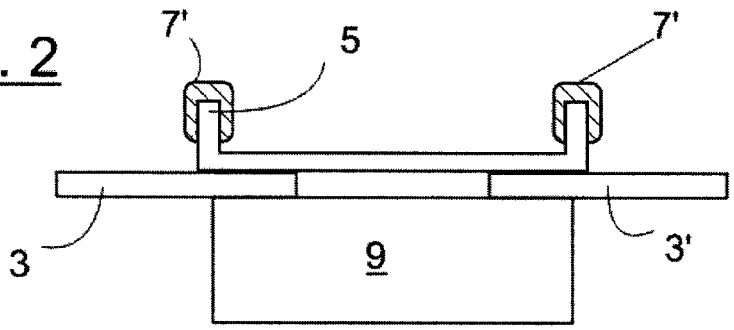
FIG. 2 shows the cross section along the line AA' of the color wheel of FIG. 1

FIG. 2 shows the cross section resulting from the cut along the line AA'. This figure shows as well a disc shaped carrier 9 to which the segments 3, 3', 3" and the motor (not shown) is connected.

In order to start the balancing process, the two equal balancing masses 7,7' of the balancing mass system are positioned on the rim 5 in such a way that the connecting line between the two balancing masses 7,7' passes through the center 11 of the color wheel. As the clips have the same mass their common center of mass lies on that center 11 and therefore does not contribute to the unbalance.

Then the measurement of the unbalance is performed. This can be done for example by rotating the color wheel and measuring the lateral forces on the motor during rotation. From this measurement the position and the required value of the balancing mass can be deduced. This is a known procedure and need not to be further explained within this description. Typically the tool used for measuring the unbalance requires calibration before measuring. In most cases part of the calibration is to tell the tool in which distance from the center 11 a balancing mass should be placed. The tool then indicates, as a result of the measurement, which mass should be placed at that distance and in which angular position this mass should be placed. It is clear that every chosen distance not equal to zero leads a defined mass, whereby the product of mass and distance remains a constant. Therefore it is easy to determine which position needs to be chosen in order to place a balancing mass equal to the total mass of the balancing system. In the example a distance of 2 cm is chosen in order to calibrate the tool. This distance corresponds to the radius R of the rim 5. If the tool now determines that in a specific direction and at the distance of 2 cm from the center 11 a balancing mass of 12 mg is required in order to eliminate the unbalance, this means that alternatively a balancing mass of 40 mg may be put in a distance of D=(12 mg×2 cm)/40 mg=0.6 cm from the center in the same direction. This however is equal to the total mass of the balancing mass system. This distance and the direction indicated by the tool indicates therefore the position 13 where a balancing mass equal to the total mass of the balancing system needs to be put in order to balance the color wheel. The color wheel is therefore balanced if it is possible to shift the center of mass of the balancing mass system to this point. A straight line 22 through this position 13 which is perpendicular to the direction indicated by the tool which goes through the center—this is indicated by the arrow 25—leads to two intersection points of the straight line 22 with the rim 5. If a mass is shifted to each of these intersection points their center of mass is shifted to the desired position. In the example this is equivalent to the calculation, that the balancing masses have to be shifted to an angular position of $$\theta = \pm a\cos(D/R) = \pm a\cos(0.6 \text{ cm}/2 \text{ cm}) = \pm 72.54°$$

measured from the direction indicated by the tool.

More generally speaking: If Mmes is the balancing mass required on the rim 5 as indicated by the tool and both available balancing masses have a mass of Ma, then they have to be shifted to positions which are differing by $$\theta = \pm a\cos\left(\frac{M_{mess}}{2M_a}\right)$$

from the direction indicated by the tool.

After this the balancing procedure is finished. However it is possible that a residual unbalance remains due to limited accuracy of positioning of the clips. If this residual unbalance exceeds the unbalance acceptable for the application it is possible to shift the clips incrementally und to measure the effect of such shifts, thereby trying to further minimize the unbalance.

Up to now balancing the description of the balancing procedure has been limited to balancing mass systems with two balancing masses only. However the scope of the invention is not limited to the use of two balancing masses. For example on could use three or even more clips. At the beginning of the procesure they then need to be positioned in such a way on the rim that their common center of mass is on the rotational axis of the color wheel.

Subject of the present invention is therefore a color wheel with means vor balancing, the means comprising a guide essentially circular with center on the rotational axis as defined by the color wheel and with at least two balancing masses which are foreseen at the guide and which may be moved independently, such masses forming a balancing mass system, the balancing masses being attached to the guide in such a way that in order to move them a force is required which exceeds their weight.

According to one embodiment of the present invention such a color wheel is characterized in that the guide is formed by a rim extending from a part of the color rotor and the clips clutch said rim in the cross section.

According to another embodiment of the present invention such color wheel is characterized in that the guide is formed by a groove in a part of the color rotor and the groove surrounds the balancing masses of the balancing mass system in the cross section.

According to another embodiment of the present invention the balancing mass system comprises only pairs of balancing masses with equal mass within each pair. The balancing mass system may comprise just two balancing masses and having equal mass.

The color wheel according to the present invention can be balanced according to a method comprising the steps of

- in a first step the balancing masses forming a balancing mass system are positioned on the guide in such a way that their common center of mass essentially lies on the rotational axis of the color wheel.
- in a following second step the position is determined where a balancing mass with mass equal to the mass of the balancing mass system would have to be positioned in order to unbalance the color wheel
- in a following third step at least one of the balancing masses is shifted in such a way that the common center of mass of the balancing mass system is shifted to the position determined in the second step.

Optionally after balancing the balancing masses may be fixed to the guide that they cannot move anymore along the guide.

In cases where the balancing mass system of the color wheel comprises only a first balancing mass and a second balancing mass, the above mentioned procedure can be further specified:

- in the first step the balancing masses are aligned diametral to each other
- in order to determine the position according to the second step the color wheel is rotated with the help of the motor and the unbalance is measured
- within the third step the balancing masses are shifted to the intersection points of a straight line with the guide, the straight line passing through the position determined in the second step and the straight line being perpendicular to a straight line passing through the center and through said position.

The above mentioned procedures lead to a color wheel with individual and independent balancing masses positioned along a guide, said guide essentially having circular shape with coaxial to the rotational axis. The common center of mass of the balancing mass system formed by said individual masses essentially being at the position where a balancing mass with mass equal to the total mass of the balancing mass system would need to be placed in order to balance the color wheel.

What is claimed is:

1. Method for balancing a color wheel with a balancing device, which balancing device encompasses an essentially circular track whose center point coincides with the axial center of rotation of the color wheel, and in which the said track is provided with two mutually independent, movable balancing weights, jointly constituting a balancing weight system, in such fashion that moving the balancing weights along the track requires a force greater than the gravitational force of the balancing weight concerned whereby

- in a first step the balancing weights are positioned on the track in such fashion that the center of gravity of the balancing weight system essentially coincides with the axial center of rotation of the color wheel
- and in a subsequent second step a determination is made of the position in which balancing weight corresponding to the total weight of the balancing weight system would have to be placed in order to balance the color wheel,
- wherein the balancing weight system includes two balancing weights,
- whereby the track is provided with one first balancing weight and one second balancing weight and whereby
- in the first step the balancing weights are positioned diametrically opposite each other,
- the determination of the position in the second step is made by setting the color wheel in motor-driven motion and the degree of imbalance is measured
- and as part of a third step the balancing weights are moved to the points of intersection between a straight line and the track, with the straight line extending through the position determined in the second step and perpendicular to the line connecting the axial center of the circle and that position, and
- wherein at least one iteration loop in which the second step and the third step are repeated is conducted to further reduce the imbalance.

2. Method as in claim 1, characterized in that, as a final step, the balancing weights are immovably clamped on and along the track.

* * * * *